(12) United States Patent
Stebnicki et al.

(10) Patent No.: US 7,331,448 B2
(45) Date of Patent: *Feb. 19, 2008

(54) MODULAR CONVEYING ASSEMBLY HAVING ROLLER CRADLES

(75) Inventors: James C. Stebnicki, Glendale, WI (US); Dean A. Wieting, Milwaukee, WI (US); Kevin S. Hansen, Grafton, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/754,729

(22) Filed: May 29, 2007

(65) Prior Publication Data

US 2007/0221481 A1    Sep. 27, 2007

Related U.S. Application Data

(63) Continuation of application No. 10/790,486, filed on Mar. 1, 2004, now Pat. No. 7,246,700.

(60) Provisional application No. 60/529,539, filed on Dec. 15, 2003, provisional application No. 60/451,520, filed on Mar. 3, 2003.

(51) Int. Cl.
*B65G 17/06* (2006.01)

(52) U.S. Cl. .................... 198/853; 198/779
(58) Field of Classification Search ........... 198/779, 198/850, 851, 853
See application file for complete search history.

(56) References Cited

U.S. PATENT DOCUMENTS

| | | |
|---|---|---|
| 1,377,450 A | 5/1921 | Whipple |
| 1,641,642 A | 9/1927 | Pangborn |
| 2,554,038 A | 5/1951 | Lemmon |
| 2,987,167 A | 6/1961 | Franz |
| 3,082,861 A | 3/1963 | Kornylak |
| 3,550,756 A | 12/1970 | Kornylak |
| 3,964,588 A | 6/1976 | Kornylak |
| 4,231,469 A | 11/1980 | Arscott |
| D289,734 S | 5/1987 | Schroeder et al. |
| D299,424 S | 1/1989 | Schroeder et al. |
| D299,425 S | 1/1989 | Schroeder et al. |
| 4,821,869 A | 4/1989 | Hodlewsky |
| 4,880,107 A | 11/1989 | Deal |
| 4,909,380 A | 3/1990 | Hodlewsky |
| 4,925,016 A | 5/1990 | LaPeyre |
| 4,993,540 A | 2/1991 | van Capelleveen |
| 5,096,050 A | 3/1992 | Hodlewsky |
| 5,224,583 A | 7/1993 | Palmaer et al. |
| 5,238,099 A | 8/1993 | Schroeder et al. |
| 5,261,525 A | 11/1993 | Garbagnati |
| 5,330,045 A | 7/1994 | Hodlewsky |
| 5,404,997 A | 4/1995 | Schreier et al. |
| 5,706,934 A | 1/1998 | Palmaer et al. |
| 6,148,990 A | 11/2000 | Lapeyre et al. |
| 6,209,714 B1 | 4/2001 | Lapeyre et al. |

(Continued)

*Primary Examiner*—Joe Dillon, Jr.
(74) *Attorney, Agent, or Firm*—Quarles & Brady LLP

(57) ABSTRACT

A roller cradle for use in a modular conveying assembly having a direction of travel in which an object is conveyed includes a first half and a second half. Each of the halves include integral hinge members defining a space therebetween. A roller having an axis of rotation substantially perpendicular to the direction of travel is retained in the space.

21 Claims, 11 Drawing Sheets

U.S. PATENT DOCUMENTS

| | | |
|---|---|---|
| 6,257,397 B1 | 7/2001 | Kilby et al. |
| 6,315,109 B1 | 11/2001 | Dean |
| 6,367,616 B1 | 4/2002 | Lapeyre et al. |
| 6,398,015 B1 | 6/2002 | Sedlacek et al. |
| 6,494,312 B2 | 12/2002 | Costanzo |
| 6,585,110 B2 | 7/2003 | Layne |
| 6,932,211 B2 | 8/2005 | Wieting et al. |
| 6,997,309 B2 | 2/2006 | Stebnicki et al. |
| 7,168,557 B2 | 1/2007 | Mitchell et al. |
| 2001/0045346 A1 | 11/2001 | Costanzo |
| 2002/0020609 A1 | 2/2002 | Lapeyre et al. |

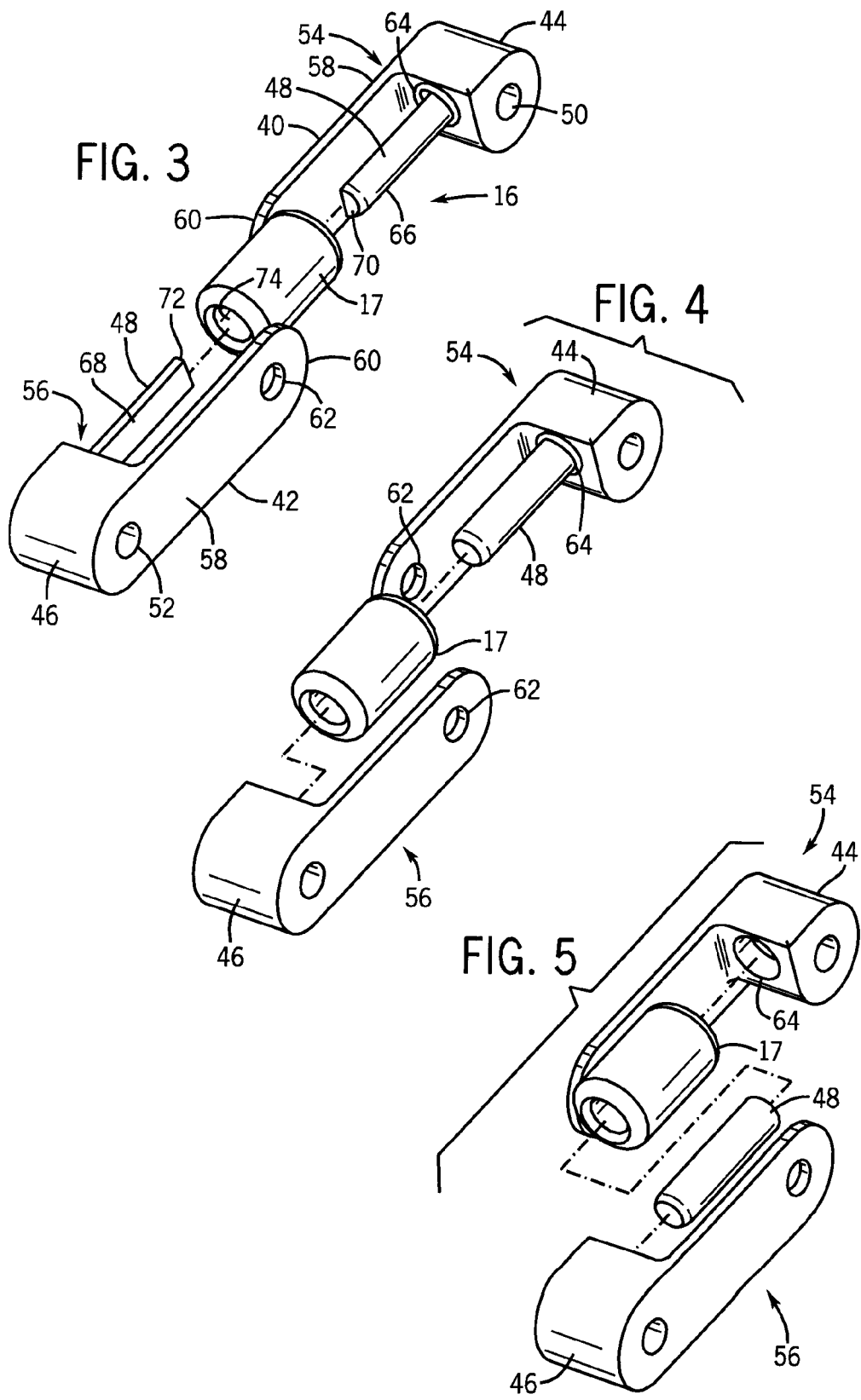

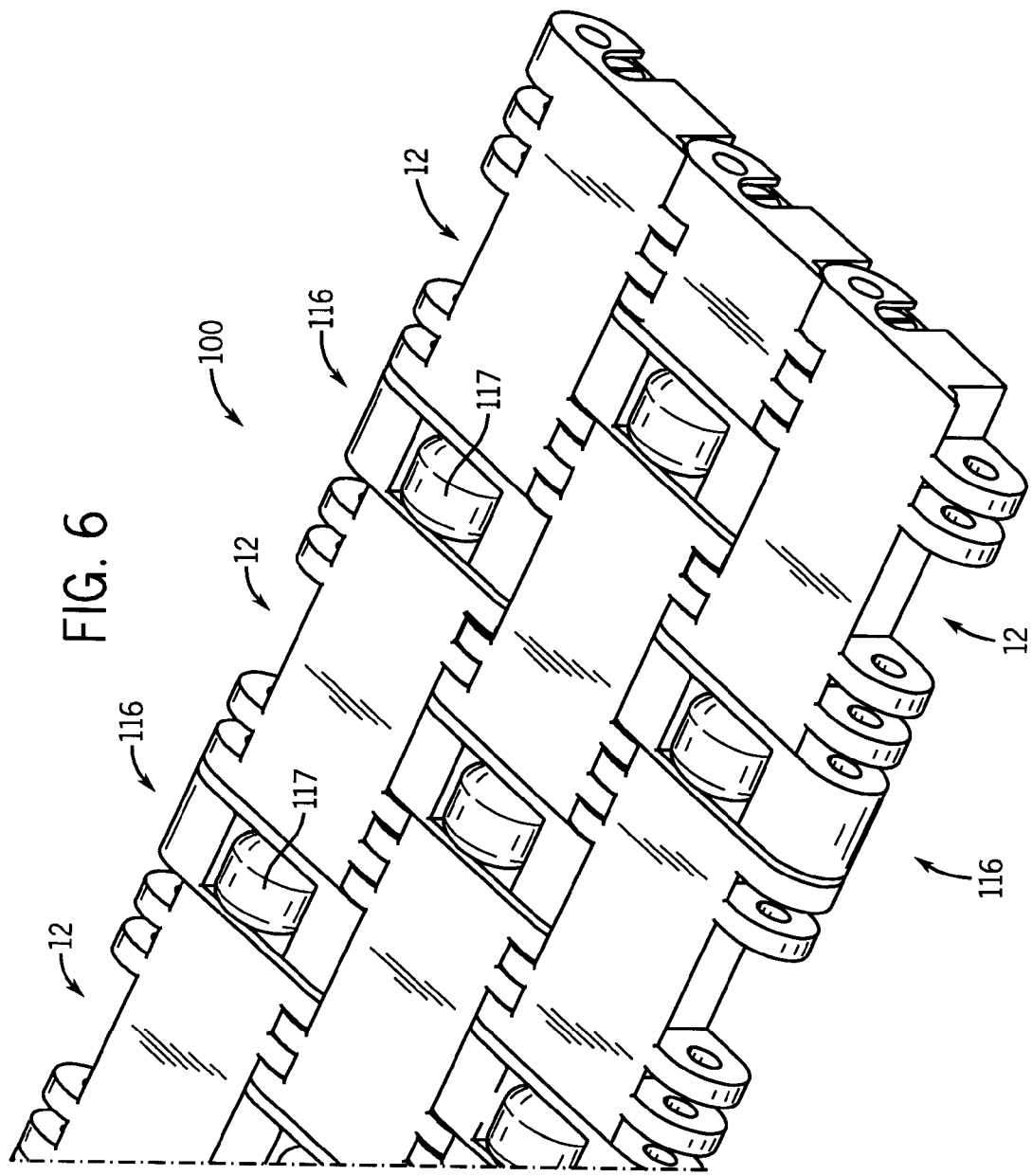

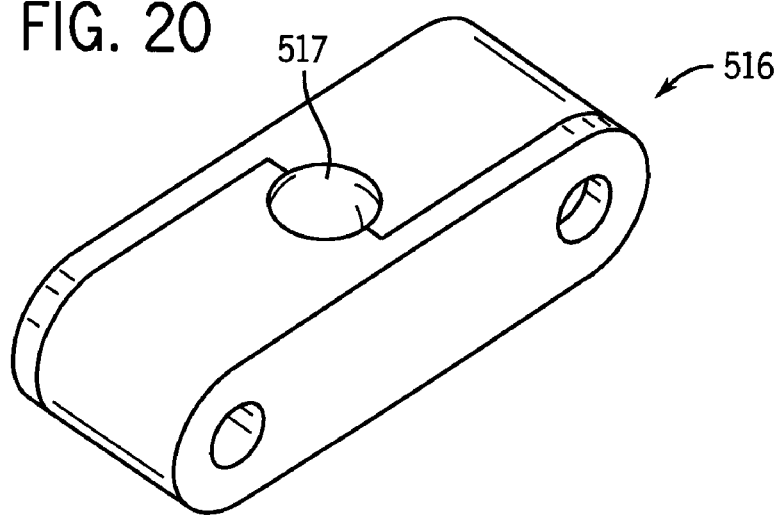
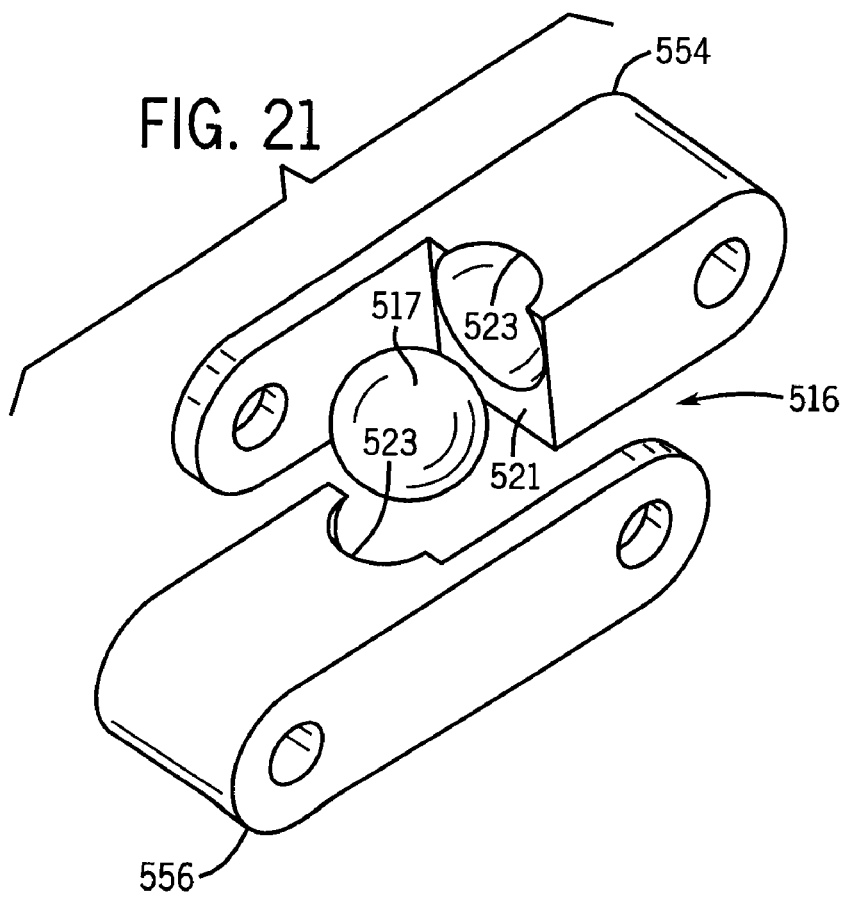

MODULAR CONVEYING ASSEMBLY HAVING ROLLER CRADLES

CROSS REFERENCES TO RELATED APPLICATIONS

This application is a continuation application of U.S. patent application Ser. No. 10/790,486 filed on Mar. 1, 2004, now U.S. Pat. No. 7,246,700 which claims priority to U.S. Provisional Patent Application No. 60/451,520 Filed on Mar. 3, 2003 and U.S. Provisional Patent Application No. 60/529,539 filed Dec. 15, 2003.

STATEMENT REGARDING FEDERALLY SPONSORED RESEARCH

Not Applicable.

BACKGROUND OF THE INVENTION

The present invention relates to modular conveying assemblies, and more particularly to a modular conveyor belt or chain including roller cradle attachments.

Modular conveyor belts and chains are formed from interconnected modules that are supported by a frame and driven to transport a product. Each module has a support surface which supports the product as the belting or chain is being driven along the frame. Modules adjacent each other are connected to each other by hinge pins inserted through meshing eyes extending from adjacent links in the direction of the belt travel.

Modular belts can transport products in the direction of belt travel, but have difficulty transferring a product, especially a high friction product, onto or off of the belt. Moreover, high friction products can easily damage the belt if the product is transferred onto the chain from a direction other than the chain direction of travel. In addition, accumulation of a product on the surface of the chain can easily damage the belt or product being conveyed.

A conveyor belt formed from roller cradles is disclosed in U.S. Pat. No. 4,231,469 issued to Arscott. The cradles support rollers that extend above the cradle for rolling contact with an object being conveyed to reduce friction between the belt and the object. Unfortunately, assembling the roller in the cradle is difficult requiring insertion of the roller into the cradle, and then slipping an axle or two stub axles through holes formed through the cradle walls and into the roller. The axle must then be secured to prevent it from slipping out of one of the holes formed in the cradle wall.

SUMMARY OF THE INVENTION

The present invention provides a modular conveying assembly for conveying an object. The assembly includes a plurality of chain modules assembled in an edge to edge relation to form a continuous belt. At least one hinge pin joins adjacent chain modules, and pivotally connects the adjacent modules in the direction of belt travel. At least one cradle adjacent at least one of the modules is retained by the at least one pin. A roller is supported by the cradle and, in one embodiment, is engageable with the object to reduce friction between the belt and the object.

In a preferred embodiment, the cradle includes a first half including an integral first hinge member. A second half including an integral second hinge member is spaced from the first hinge member and defines a space therebetween. A roller having an axis of rotation substantially perpendicular to the direction of travel is retained in the space between the first half and the second half.

A general objective of the present invention is to provide a modular conveying assembly that call convey high friction objects without severely damaging the objects or the assembly. This objective is accomplished by providing a roller cradle in the assembly that supports a roller that reduces friction between the object and the conveying assembly.

Another objective of the present invention is to provide a cradle that is easy to assemble. This objective is accomplished by forming a cradle from two halves defining a space therebetween and supporting the roller on the space.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a perspective, exploded view of the cradle shown in FIG. 1;

FIG. 4 is a perspective, exploded view of another embodiment of a cradle for use in the belt of FIG. 1:

FIG. 5 is a perspective, exploded view of yet another embodiment of a cradle for use in the belt of FIG. 1:

FIG. 6 is a perspective view of another embodiment of a modular conveying assembly incorporating the present invention;

FIG. 20 is a perspective view of an embodiment of a cradle having a roller ball for use in a modular conveying assembly; and FIG. 21 is an exploded view of the cradle of FIG. 20.

DETAILED DESCRIPTION OF PREFERRED EMBODIMENTS

Figure 1:
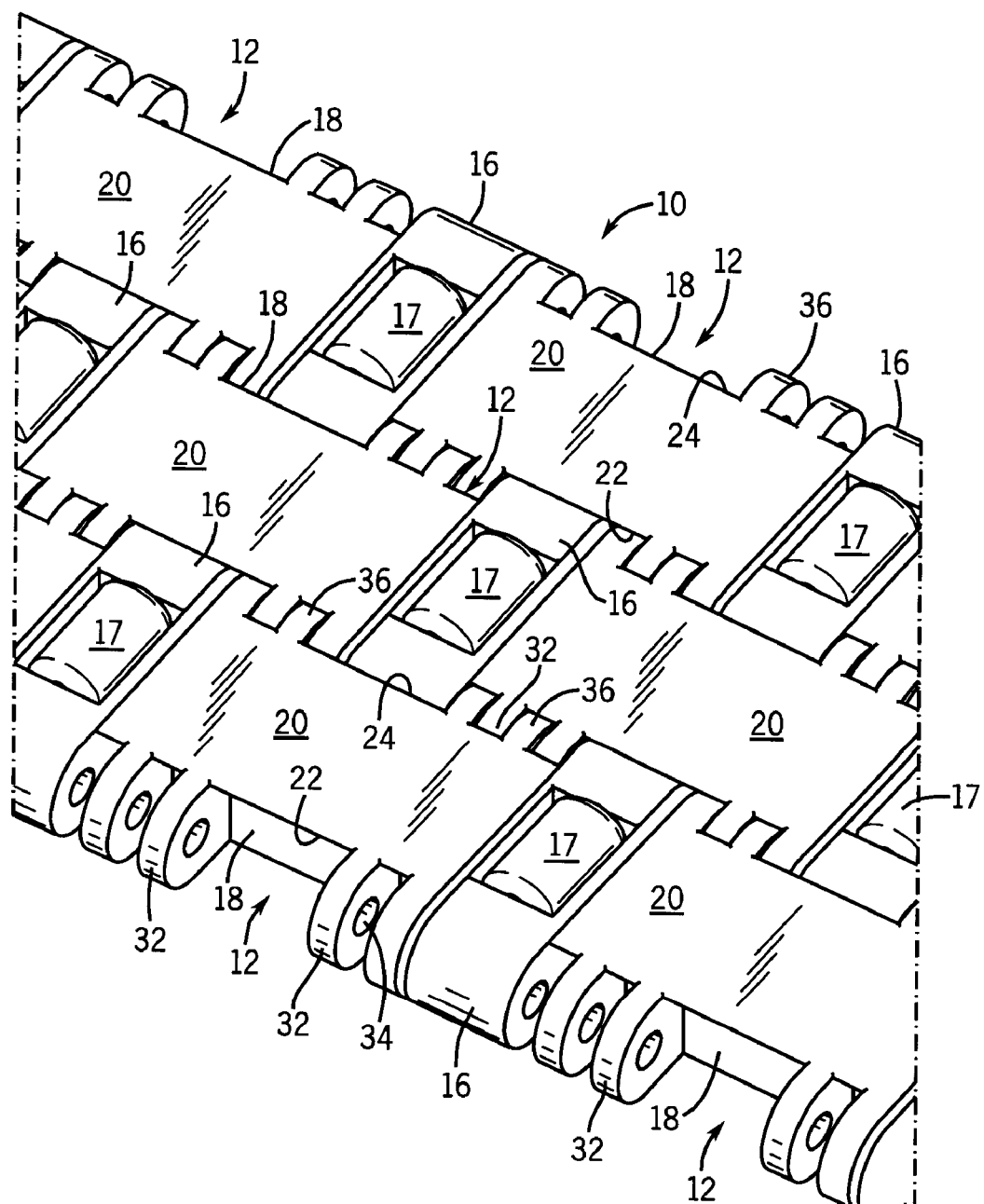
FIG. 1 is a perspective view of a modular conveying assembly incorporating the present invention.
Figure 2:
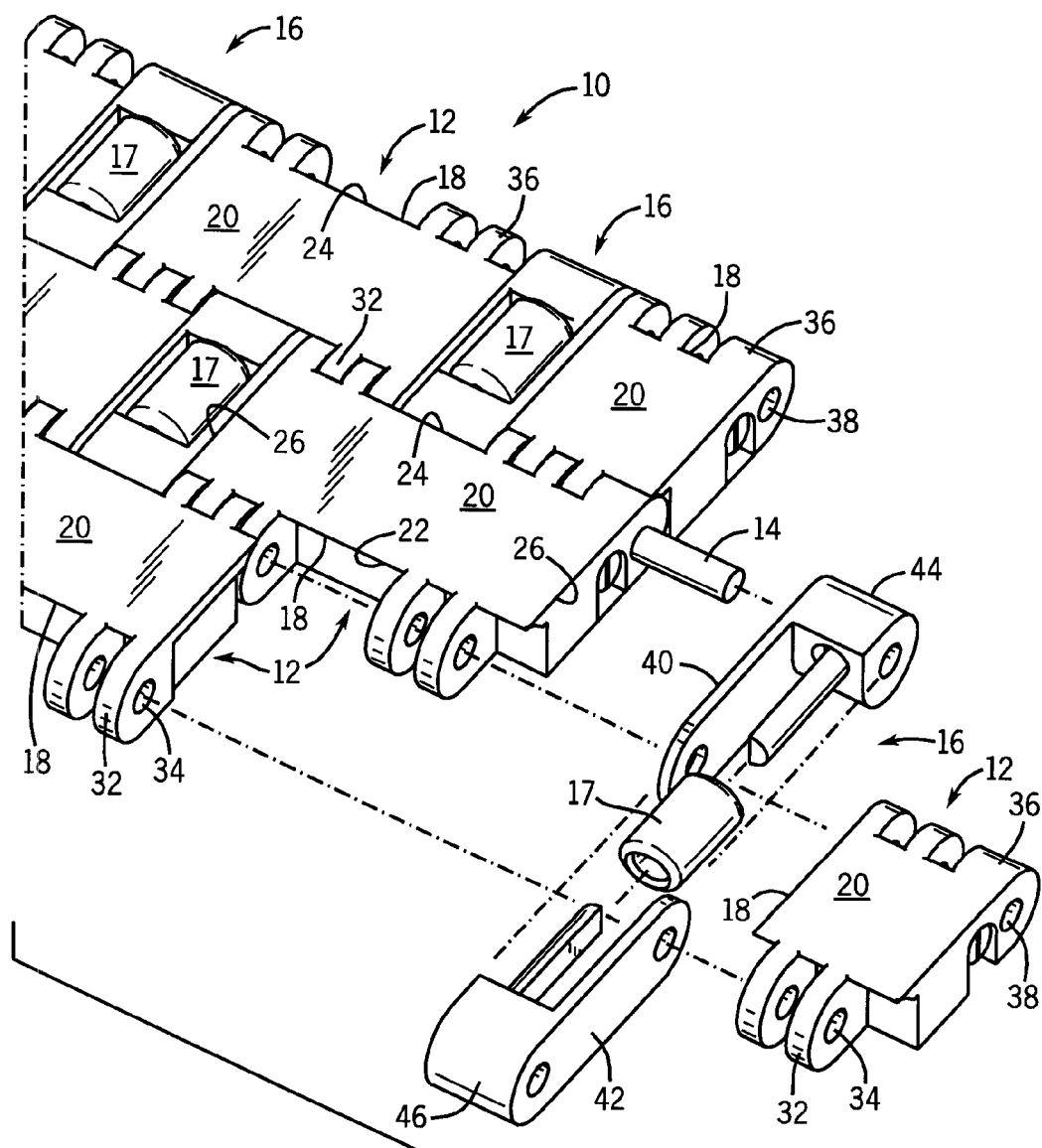
FIG. 2 is a partially exploded perspective view of the modular conveying assembly of FIG. 1.

A modular conveyor assembly forming a belt 10, shown in FIGS. 1 and 2, includes a plurality of chain modules 12 assembled in an edge to edge relation to form the continuous belt 10. Hinge pins 14 join adjacent modules 12, and pivotally connect the adjacent modules 12 in the direction of belt travel. Cradles 16 retained by the pins 14 between modules 12 in a row support transverse cylindrical rollers 17 that rotatably engage an object being conveyed by the belt 10 to reduce friction between the belt 10 and the object. A row of modules 12 is a plurality of the modules 12 disposed between adjacent hinge pins 14. The rollers 17 in this embodiment are considered transverse rollers because they have an axis of rotation aligned in the direction of belt travel (indicated by the arrow in FIG. 2) and convey an object transverse to the direction of belt travel. Advantageously, if the module 12, cradle 16, or roller 17 is damaged, only the damaged component need be replaced.

The modules 12 are preferably formed using methods known in the art, such as injection molding, from materials known in the art, such as acetal, polyethylene, polypropylene, nylon, and the like. Each module 12 includes a body 18 having a top surface 20 surrounded by a leading edge 22 and trailing edge 24 joined by side edges 26. Advantageously, the top surface 20 can engage objects being conveyed by the belt 10.

module body 18 has a width which is defined by the distance between the side edges 26, and a length which is defined by the distance between the longitudinal leading and trailing edges 22, 24. Leading edge hinge members 32 extending forwardly from the leading edge 22 of the module body 18 include coaxial openings 34. The opening 34 formed in each leading edge hinge member 32 is coaxial with the opening 34 in the adjacent leading edge hinge member 32 for receiving the hinge pin 14. Trailing edge hinge members 36 extending rearwardly from the trailing edge 24 also include coaxial openings 38. As in the leading edge hinge member openings 34, the opening 38 formed in each trailing edge hinge member 36 is coaxial with the opening in the adjacent trailing edge hinge member 36 of a module 12.

The forwardly extending leading edge hinge members 32 of one module 12 intermesh with trailings edge hinge members 36 extending rearwardly from an adjacent module 12. When the intermeshing hinge members 32, 36 are aligned, the openings 34, 38 in the aligned hinge members 32, 36 are aligned to receive the hinge pin 14 which pivotally joins the modules 12 together. Although hinge members 32, 36 extending rearwardly and forwardly from the leading and trailing edges 22, 24, respectively, is shown, the hinge members 32, 36 can also extend in other directions, such as downwardly, proximal the respective edges 22, 24 without departing from the scope of the present invention.

The cradles 16 are retained by the hinge pins 14, and are not attached directly to the modules 12. Preferably, the cradles 16 are preferably formed using methods known in the art, such as injection molding, from materials known in the art, such as acetal, polyethylene, polypropylene, nylon, and the like. However, the cradles can be formed using other materials, such as metal, without departing from the scope of the invention.

In the embodiments disclosed in FIGS. 1-5, each cradle 16 has two parallel side walls 40, 42 and two opposing hinge members 44, 46. The hinge members 44, 46 define a space, or opening, therebetween that is framed by the hinge members 44, 46 and side walls 40, 42. A shaft 48 extending through the opening between the hinge members 44, 46 rotatably supports the roller 17 disposed in the opening. The hinge pins 14 pivotally joining the adjacent modules 12 slip into apertures 50, 52 formed through the cradle hinge members 44, 46 that are aligned with the module openings 34, 38 to fix the cradle 16 relative to the adjacent modules 12. The position and number of cradles 16 in a belt 10 is customizable, and depends upon the conveyor belt application.

Each cradle 16 is formed from two separately formed halves 54, 56 to simplify assembly. Each half 54, 56 includes one of the side walls 40, 42 having one end 58 joined to one of the hinge members 44, 46. The opposing end 60 of each side wall 40, 42 abuts an end of the other hinge member 44, 46, and includes an aperture 62 for receiving the hinge pin 14 extending through the other hinge member 44, 46 joining the adjacent modules 12.

The shaft 48 extends between the hinge members 44, 46 through the opening, and is substantially parallel and adjacent to the side walls 40, 42 of the assembled cradle 16, such that the shaft is aligned with the direction of belt travel. A shaft opening 64 formed in each hinge member 44, 46 opens toward the other hinge member 44, 46 of the assembled cradle 16, and receives one end of the shaft 48. The shaft can be formed from any known material, such as plastic, metal, and the like. The shaft material is dependent upon the shaft length and forces that will be exerted upon the shaft 48 in the intended use of the belt 10.

In the embodiment disclosed in FIGS. 2 and 3, the shaft 48 is formed from two shaft halves 66, 68. Each shaft half 66, 68 extends from one of the hinge members 44, 46, and defines a shaft cross section that is semicircular, such as a half circle, to form the shaft 48 having a circular cross section when the cradle 16 is assembled from the cradle halves 54, 56. The half shaft ends can be retained in the hinge member shaft openings 64 using methods known in the art, such as a friction fit, adhesives, and the like, to simplify assembly. Moreover, if the shaft 48 is not formed from two halves, such as disclosed in FIG. 4, one end of the shaft 48 can be retained in one of the hinge member shaft openings 64, or formed as an integral part of the cradle half 54, to simplify assembly. However, once the cradle halves 54, 56 are assembled together to form the cradle 16, the shaft cannot slip out of the shaft openings 64, and a means for retaining the shaft 48 in only one shaft opening 64 is not necessary, such as shown in FIG. 5.

Referring back to FIGS. 1-3, the roller 17 is supported by the shaft 48 in the frame opening. At least a portion of the roller 17 extends above the cradle 16 to engage the object being conveyed by the belt 10. Preferably, the roller 17 is molded from a plastic, and includes a throughhole 74 formed therethrough for receiving the shaft 48. Advantageously, if the roller 17 extends above the cradle 16 to engage an object being conveyed, the roller 17 rotates about the shaft 48 to minimize friction between the belt 10 and object being conveyed.

The cradle 16 is assembled by slipping the distal ends 70, 72 of each shaft half 66, 68 into opposite ends of the roller throughhole 74. The distal ends 70, 72 are then slipped into the opposing hinge member shaft opening 64 such that each end of the shaft 48 is supported by one of the hinge members 44, 46. An end of each hinge member 44, 46 of each cradle half 54, 56 abuts a face of the opposing cradle half side wall opposing end 60, such that the hinge member aperture 50, 52 is aligned with the aperture 62 formed in the opposing cradle half side wall opposing end 60. A hinge pin 14 joining the adjacent modules 12 is then slipped through the hinge member aperture 50 of one cradle half 54 and the side wall aperture 62 of the other cradle half 56, and another hinge pin 14 is slipped through the hinge member aperture 52 of the other cradle half 56 and the side wall aperture 62 of the one cradle half 54 to prevent the cradle halves 54, 56 from separating.

Figure 7:
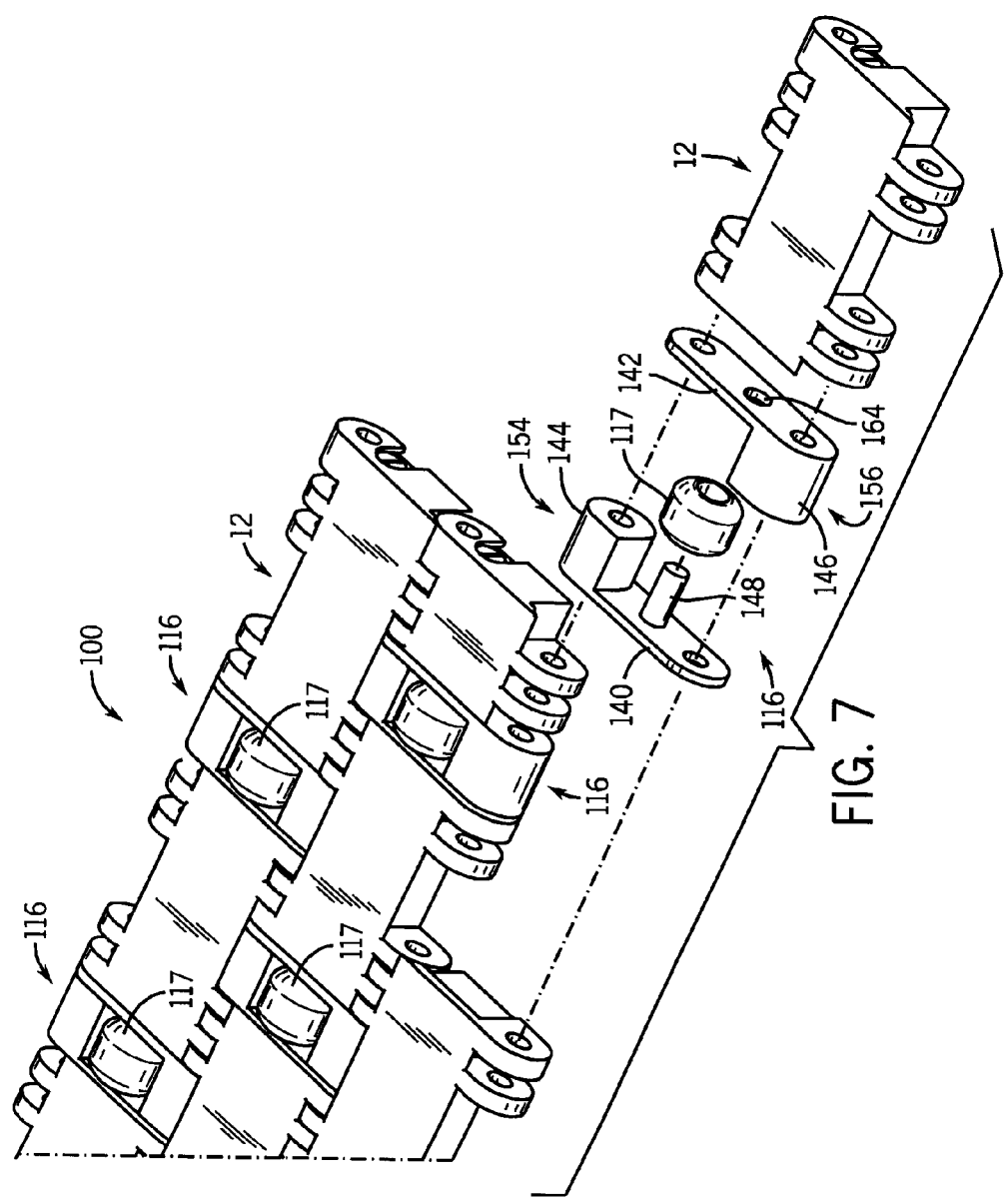
FIG. 7 is a partially exploded perspective view of the modular conveying assembly of FIG. 6.
Figure 8:
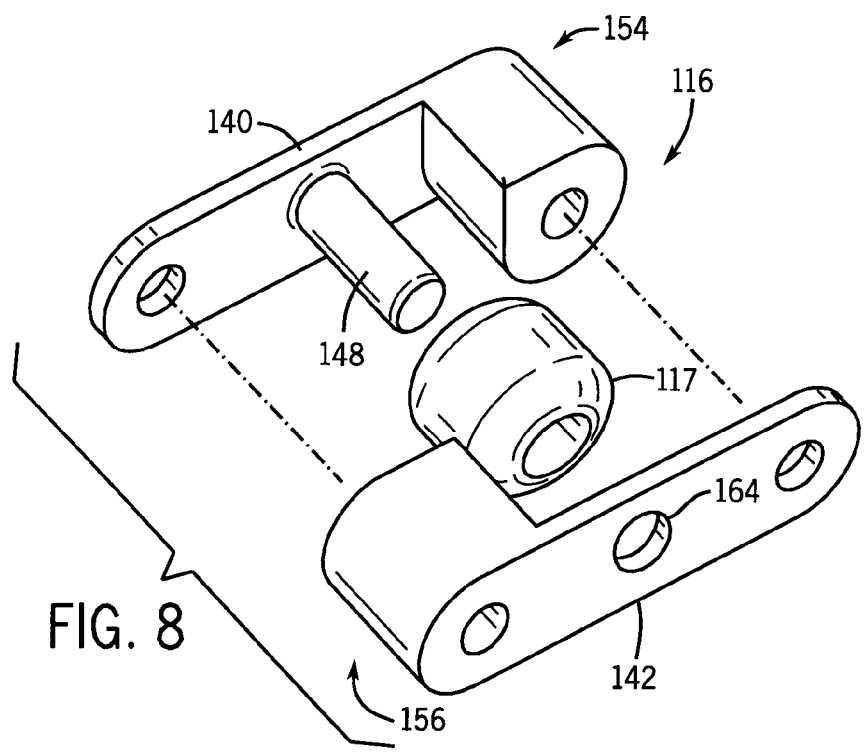
FIG. 8 is a perspective, exploded view of the cradle shown in FIG. 6.
Figure 9:
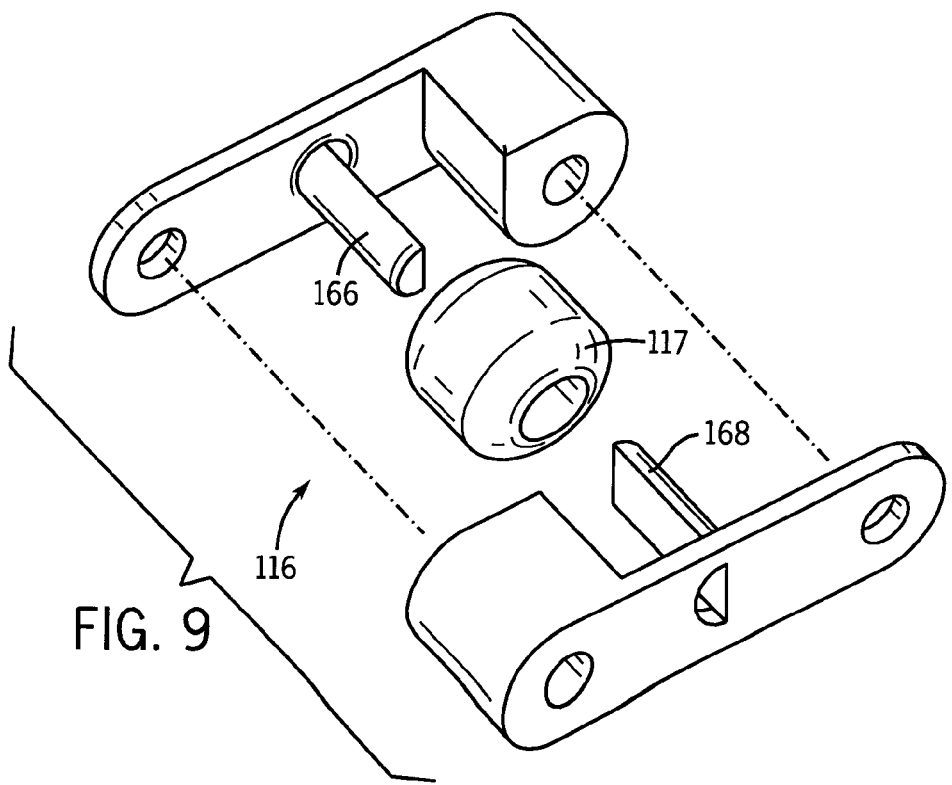
FIG. 9 is a perspective, exploded view of another embodiment of a cradle for use in the assembly of FIG. 6.
Figure 10:
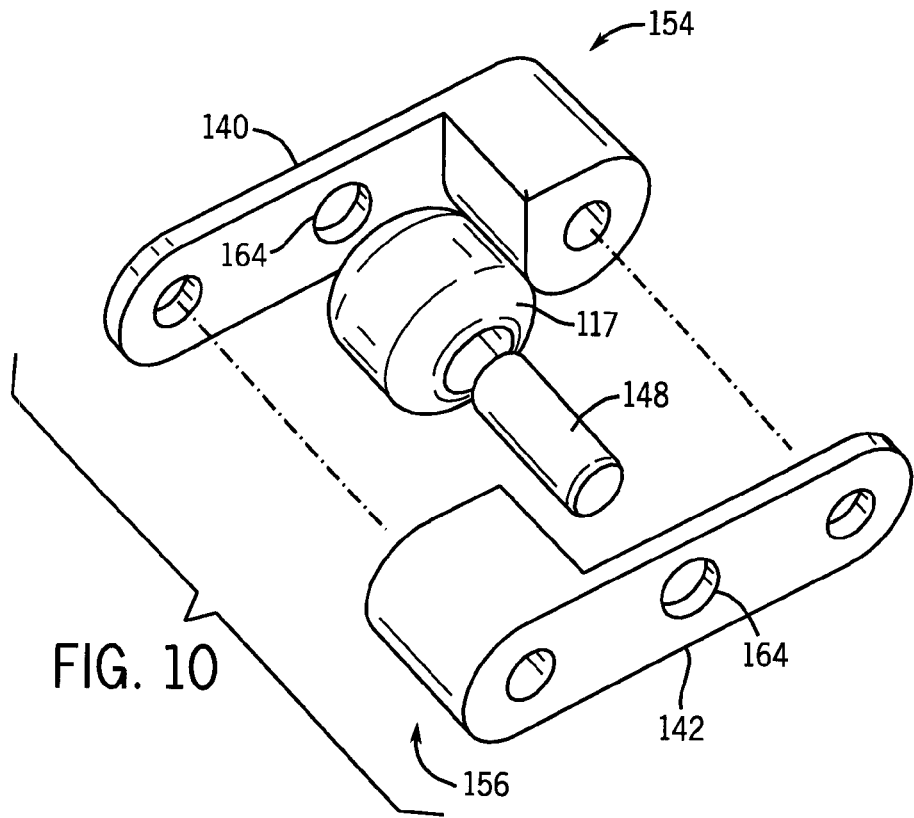
FIG. 10 is a perspective, exploded view of yet another embodiment of a cradle for use in the assembly of FIG. 6.

In another embodiment of the present invention shown in FIGS. 6-8, a modular conveyor belt 100 includes a cradle 116 supporting a low back pressure roller 117. The roller 117 shown in FIGS. 6-8 is considered a low back pressure roller because they have an axis of rotation transverse to the direction of belt travel and convey an object in the direction of belt travel. As in the transverse roller embodiments disclosed in FIGS. 1-5, the cradle 116 disclosed in FIGS. 6-8 is formed from two halves 154, 156. Each half 154, 156 includes a hinge member 144, 146 and a side wall 140, 142, respectively. As opposed to the transverse roller embodiments, however, the shaft 148 shown in FIGS. 6-8 extends between the side walls 140, 142 in a direction transverse to the direction of belt travel to rotatably mount the low back pressure roller 117. The shaft 148 is formed as an integral part of the side wall 140 of one half 154, and has a distal end 149 that is received in the shaft opening 164 formed in the side wall 142 of the other half 156. Of course, the shaft 148 call be formed from two half shafts 166, 168, as disclosed in FIGS. 9 and 11, and the shaft 148 can be press fit in the shaft openings 164 formed in both side walls 140, 142, as shown in FIG. 10, without departing from the scope of the invention.

Figure 11:
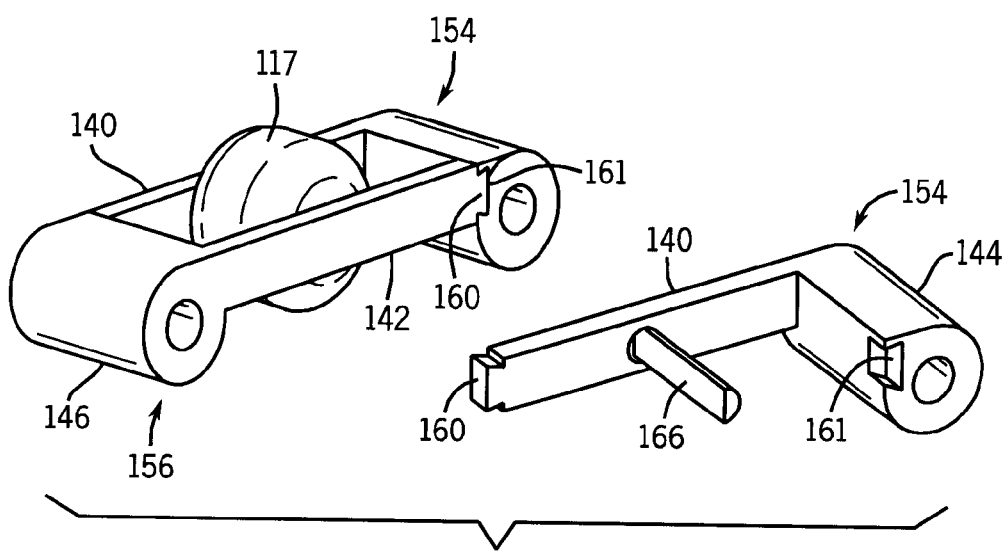
FIG. 11 is a perspective, exploded view of yet another embodiment of a cradle for use in the assembly of FIG. 6.

In the embodiment disclosed in FIG. 11, opposing ends 160 of each side wall 140, 142 have a dovetail shape that is received in complementary notches 161 formed in the hinge member 144, 146 forming part of the opposing cradle half 154, 156. The dove tailed side wall end 160 interlocks with the notch 161 prevents the cradle halves 154, 156 from separating in the direction of belt travel due to spacing fluctuations between the hinge pins 14 joining the cradle 116 to the modules 12.

Figure 12:
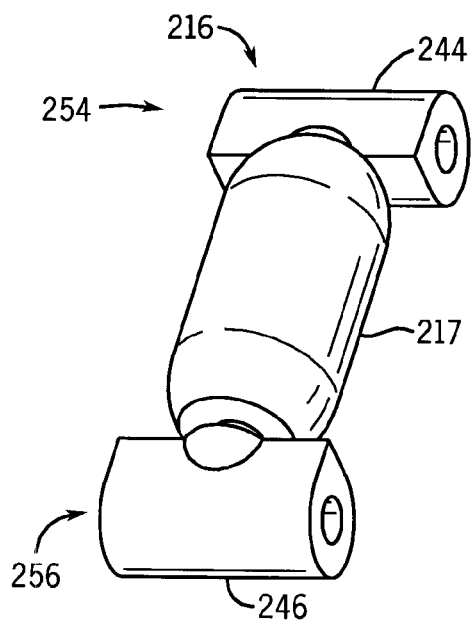
FIG. 12 is a perspective view of yet another embodiment of a cradle for use in the assembly of the FIG. 1.
Figure 13:
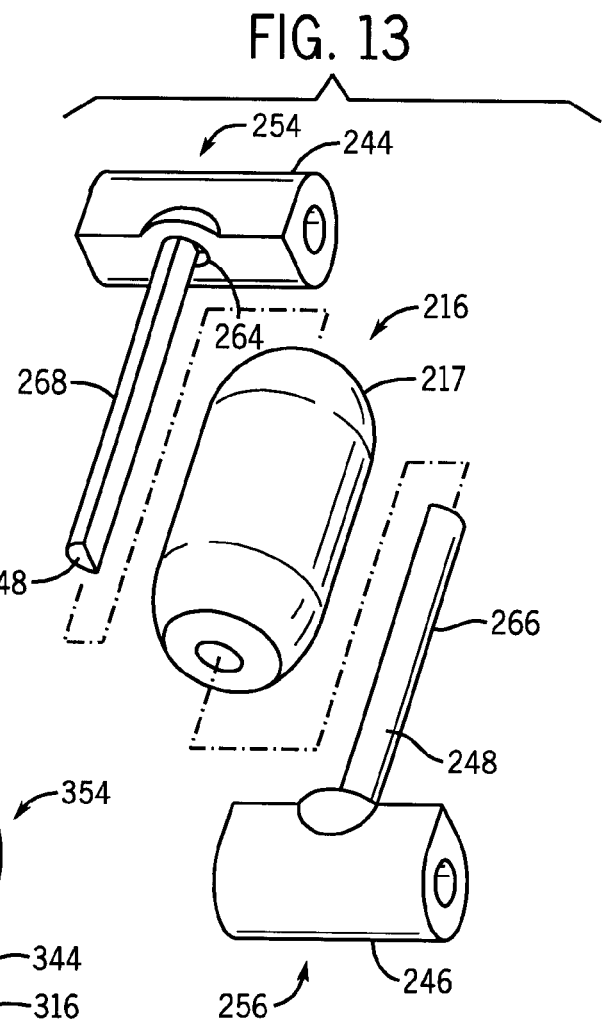
FIG. 13 is an exploded view of the cradle of FIG. 12.
Figure 14:
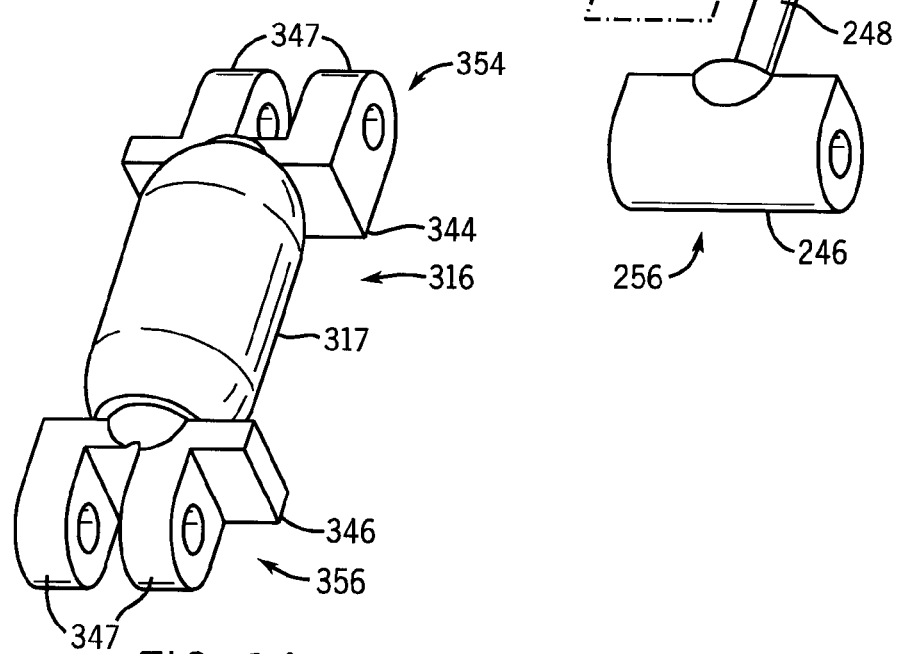
FIG. 14 is a perspective, exploded view of yet another embodiment of a cradle for use in the assembly of FIG. 1.

In yet another embodiment of the present invention shown in FIGS. 12-14, cradles 216, 316 Supporting transverse rollers 217, 317 are formed from cradle halves 254, 256, 354, 356 without sidle walls. The cradles 216, 316 include a shaft 248 extending between hinge members 244, 246, 344, 346. As shown in FIG. 13, the hinge members 244, 246 include shaft openings 264 for supporting the shaft ends. Although a shaft formed from shaft halves 266, 268 is shown in FIG. 13, shafts 48, such as disclosed in FIGS. 4 and 5 can also be used without departing from the scope of the invention. In the embodiment disclosed in FIG. 14, each hinge member 344, 346 includes a pair of meshing eyes 347 for receiving the hinge pins 14.

Figure 15:
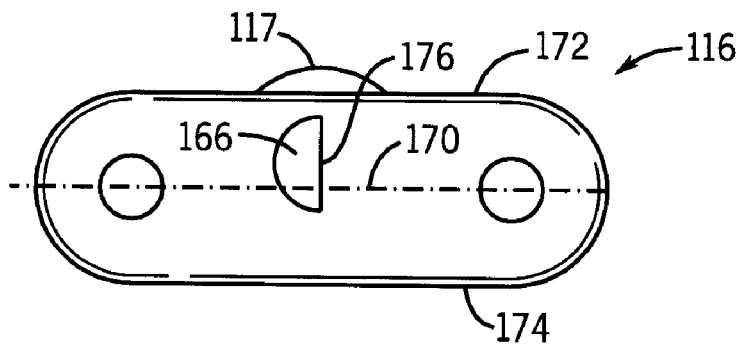
FIG. 15 is a side elevation view of the cradle of FIG. 10.

In yet other embodiments, shown in FIGS. 15-17, cradles including a shaft supporting a roller is positioned to extend a portion of the roller above the cradle (shown in FIG. 15), below the cradle (shown in FIG. 17), or above and below the cradle (shown in FIG. 16). As shown in FIG. 15, a version of the roller cradle 116 shown in FIG. 10 for use in the belt 100 shown in FIG. 6, includes a shaft formed from shaft halves (only shaft half 166 is shown) and defining a shaft axis 176. The shaft axis 176 is located above a midpoint 170 between cradle upper and lower edges 172, 174, such that a portion of the roller 117 supported by the shaft extends above the upper edge 172 of the cradle 116. Advantageously, a cradle 116 having a portion of the roller 117 extending above the cradle 116, such as shown in FIG. 15, allows an object to move relative to the cradle 116, and thus the belt 100, to minimize back pressure.

Figure 16:
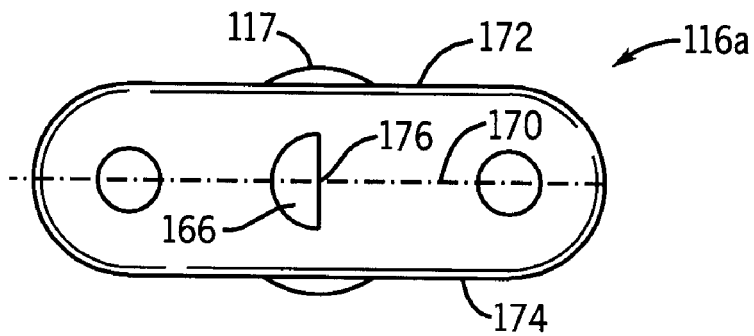
FIG. 16 is a side elevation view of another embodiment of the cradle of FIG. 10 showing the roller extending above and below the cradle.

In FIG. 16, a cradle 116*a* for use in the belt 100 shown in FIG. 6, includes a shaft formed from shaft halves (only shaft half 166 is shown) and defining a shaft axis 176. In FIG. 16, the shaft axis 176 is located substantially at the midpoint 170 between the cradle upper and lower edges 172, 174 and a roller 117 supported by the shaft has a diameter larger than the distance between the cradle upper and lower edges 172, 174, such that a portion of the roller 117 extends above the roller cradle upper edge 172 and a portion of the roller 117 extends below the cradle lower edge 174. Advantageously, an object being conveyed by a belt including the cradles 116*a* having rollers 117 extending above and below the cradle 116*a*, such as shown in FIG. 16, can be accelerated in the direction of conveyor travel by engaging the portion of the rollers 117 extending below the cradle lower edge 174 with a surface that rotates the rollers 117 to propel the object supported by the portion of the roller 117 extending above the cradle upper edge 172.

Figure 17:
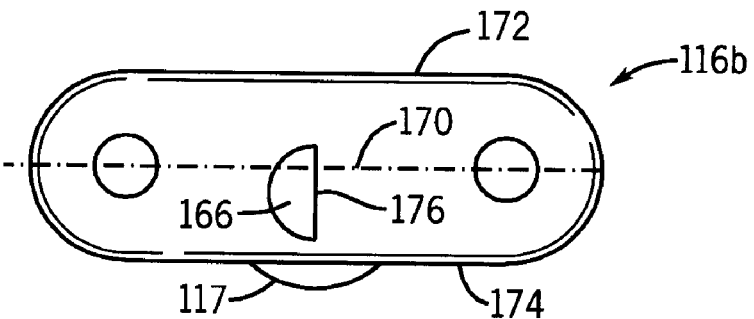
FIG. 17 is side elevation view of another embodiment of the cradle of FIG. 10 showing the roller extending below the cradle.

In FIG. 17, a cradle 116*b* for use in the belt 100 shown in FIG. 6, includes a shaft formed from shalt halves (only shaft half 166 is shown) and defining a shaft axis 176. In FIG. 17, the shaft axis 176 is located below the midpoint 170 between the cradle upper and lower edges 172, 174, such that a portion of the roller 117 supported by the shaft extends below the lower edge 174 of the cradle 116*b*. Advantageously, friction between a belt and a supporting surface can be minimized by providing the cradle 116*b* having a roller 117 extending below the cradle lower edge 174, such as shown in FIG. 17, that engages the supporting surface.

Figure 18:
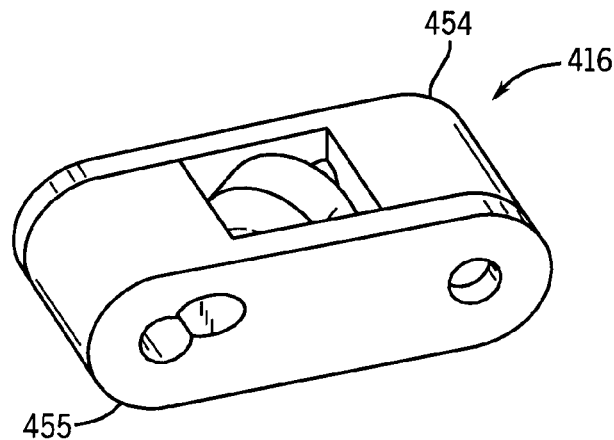
FIG. 18 is a perspective view of an embodiment of a cradle having an angled shaft for use in a modular conveying assembly.
Figure 19:
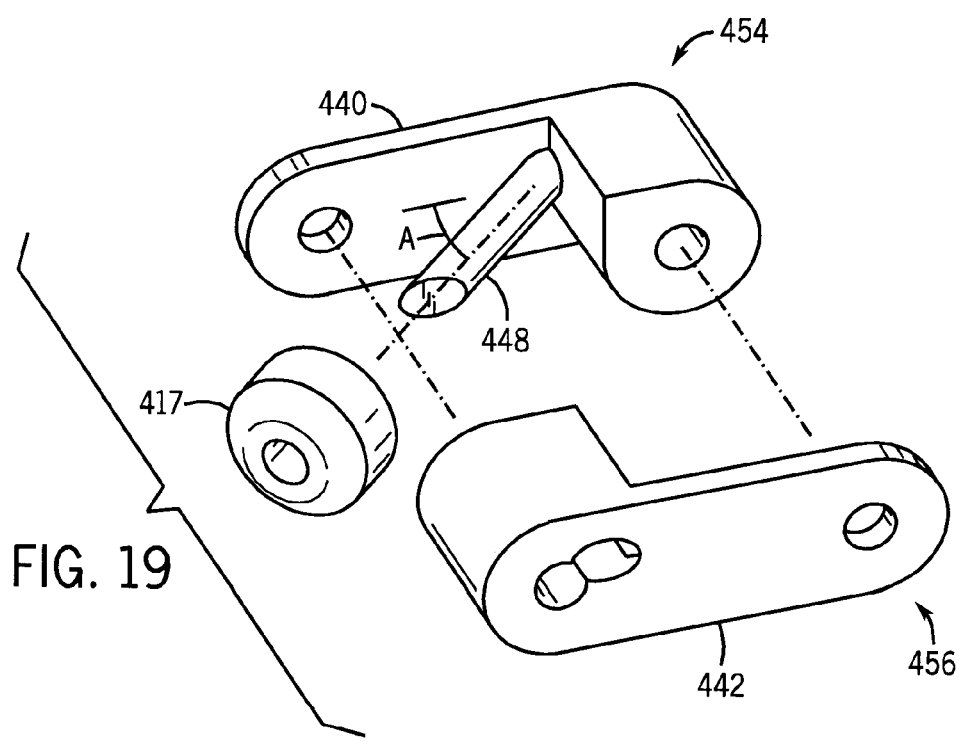
FIG. 19 is an exploded view of the cradle of FIG. 18.

In still another embodiment of the present invention shown in FIGS. 18 and 19, a roller cradle 416 for use in the belt 10 shown in FIG. 1 and the belt 100 shown in FIG. 6 includes a shaft 448 extending between shaft halves 454, 456 at an angle A defined by the cradle side walls 440, 442 and the shaft 448, such that the shaft 448 is aligned in a direction between the direction of belt travel and the direction transverse to the direction of belt travel. The shaft 448 rotatably supports a roller 417 which can support an object being conveyed. The angled shaft 448 allows the object to be transferred onto and off of a belt including the cradle 416 at an angle generally corresponding to angle A.

In yet another embodiment shown in FIGS. 20 and 21, a cradle 516 for use in the belt 10 shown in FIG. 1 and the belt 100 shown in FIG. 6 supports a spherical roller 517. The cradle 516 includes lower and upper shelves 521, 523 extending from each shaft half 554, 556 to rotatably secure the roller 517 between the shaft halves 554, 556. The lower shelves 521 extend beneath the ball diameter, and in the embodiment shown in FIGS. 20 and 21 beneath the roller 517, to support the roller 517. The upper shelves 523 extend toward the roller 517 above the ball diameter to secure the roller 517 relative to the lower shelves 521 and allow a portion of the roller 517 to extend above the cradle 516 and support an object being conveyed. Although shelves are preferred, other structure can be provided, such as shafts or other retention member, extending between the cradle halves to rotatably secure the roller relative to the cradle without departing from the scope of the invention. Moreover, the roller 517 and shelves can be sized, such that the roller extends above, below, or above and below the cradle 516 without departing from the , scope of the invention.

While there has been shown and described what are at present considered the preferred embodiments of the invention, it will be obvious to those skilled in the art that various changes and modifications can be made therein without departing from the scope of the invention defined by the appended claims. For example, in the embodiments disclosed in FIGS. 1-5, both cradle halves include a side wall. However, one cradle halve can be provided without a side wall without departing from the scope of the invention. In addition, the side walls in the embodiments including side walls engage or abut the opposing hinge member, in other embodiments, cradle halves can be provided with side walls that do not touch any part of the other cradle half without departing from the scope of the invention.

We claim:

1. A roller cradle for use in a modular conveying assembly having a direction of travel in which an object is conveyed, said cradle comprising:
   a first half including a side portion and an integral first hinge member;
   a second half formed separately from said first half and including a side portion and a second integral hinge member spaced from said first hinge member and defining a space therebetween; and
   a roller retained in said space between said first half and said second half.

2. The roller cradle as in claim 1, in which a shaft extends between said first and second halves through said space, and said shaft retains said roller in said space.

3. The roller cradle as in claim 2, in which said shaft extends through said roller to rotatably mount said roller in said space.

4. The roller cradle as in claim 2, in which each of said first half and second half includes a shaft aperture that receives one end of said shaft.

5. The roller cradle as in claim 2, in which said shaft is formed from two shaft halves, and each shaft half has a semicircular cross section.

6. The roller cradle as in claim 1, including a first cradle side wall having first and second ends, said first end being joined to one of said hinge members, and said second end extending toward the other of said hinge members.

7. The roller cradle as in claim 6, in which said second end interlocks with said other of said hinge members.

8. The roller cradle as in claim 6, including a second cradle side wall having a first end and a second end, said first end of said second cradle side wall being joined to said other of said hinge members, and said second end of said second cradle side wall extending toward said one of said hinge member to frame said space between said hinge members.

9. The roller cradle as in claim 8, in which a shaft extends through said space between said first and second side walls, and said shaft retains said roller in said space.

10. The roller cradle as in claim 1, in which at least one of said hinge members includes more than one meshing eye.

11. The roller cradle as in claim 1, in which at least a portion of said roller extends at least one of above said cradle and below said cradle.

12. The roller cradle as in claim 1, in which said roller has an axis of rotation substantially perpendicular to the direction of travel.

13. A modular conveying assembly for conveying an object in a direction of travel, said assembly comprising:
   a plurality of chain modules assembled in an edge to edge relation to form a continuous belt;
   at least one hinge pin joining adjacent chain modules, and pivotally connecting the adjacent modules in the direction of belt travel;
   at least one roller cradle adjacent at least one of said modules is retained by said at least one pin, said cradle including a first half including a side portion and an integral first hinge member, a second half formed separately from said first half and including a side portion and a second integral hinge member spaced from said first hinge member and defining a space therebetween, and a roller retained in said space between said first half and said second half.

14. The modular conveying assembly as in claim 13, in which said at least one roller cradle includes a shaft extends between said first and second halves through said space, and said shaft retains said roller in said space.

15. The modular conveying assembly as in claim 14, in which said shaft extends through said roller to rotatably mount said roller in said space.

16. The modular conveying assembly as in claim 13, in which said at least one roller cradle includes a first cradle side wall having first and second ends, said first end being joined to one of said hinge members, and said second end extending toward the other of said hinge members.

17. The modular conveying assembly as in claim 13, in which said at least one roller cradle includes at least one of said hinge members having more than one meshing eye.

18. The modular conveying assembly as in claim 13 in which said at least one roller cradle includes at least a portion of said roller extending at least one of above said cradle and below said cradle.

19. The modular conveying assembly as in claim 16, in which said second end interlocks with said other of said hinge members.

20. The modular conveying assembly as in claim 16, in which said at least one roller cradle includes a second cradle side wall having a first end and a second end, said first end of said second cradle side wall being joined to said other of said hinge members, and said second end of said second cradle side wall extending toward said one of said hinge member to frame said space between said hinge members.

21. The modular conveying assembly as in claim 20, in which a shaft extends through said space between said first and second side walls, and said shaft retains said roller in said space.

* * * * *

UNITED STATES PATENT AND TRADEMARK OFFICE
CERTIFICATE OF CORRECTION

PATENT NO. : 7,331,448 B2
APPLICATION NO. : 11/754729
DATED : February 19, 2008
INVENTOR(S) : Stebnicki et al.

It is certified that error appears in the above-identified patent and that said Letters Patent is hereby corrected as shown below:

Col. 2, Line 4
"that call convey" should be
--that can convey--

Col. 2, Line 49
"of the FIG. 1" should be
--of FIG. 1--

Col. 3, Line 29
"module body" should be
--The module body--

Col. 3, Line 45
"with trailings edge" should be
--with trailing edge--

Col. 3, Line 56
"16 arc retained" should be
--16 are retained--

Col. 4, Line 33
"a shalt cross" should be
--a shaft cross--

Col. 4, Line 46
"one shalt opening" should be
--one shaft opening--

Col. 4, Line 55
"the shalt 48" should be
--the shaft 48--

UNITED STATES PATENT AND TRADEMARK OFFICE
CERTIFICATE OF CORRECTION

PATENT NO. : 7,331,448 B2
APPLICATION NO. : 11/754729
DATED : February 19, 2008
INVENTOR(S) : Stebnicki et al.

It is certified that error appears in the above-identified patent and that said Letters Patent is hereby corrected as shown below:

Col. 5, Line 26
"call be" should be
--can be--

Col. 5, Line 42
"316 Supporting" should be
--316 supporting--

Col. 5, Line 44
"without sidle walls" should be
--without side walls--

Col. 6, Line 22
"from shalt halves" should be
--from shaft halves--

Signed and Sealed this

Fifth Day of August, 2008

JON W. DUDAS
*Director of the United States Patent and Trademark Office*